United States Patent
Redmond

(10) Patent No.: US 7,301,944 B1
(45) Date of Patent: Nov. 27, 2007

(54) MEDIA FILE DISTRIBUTION WITH ADAPTIVE TRANSMISSION PROTOCOLS

(75) Inventor: Scott D. Redmond, San Francisco, CA (US)

(73) Assignee: Tranz-Send Broadcasting Network, Inc., San Francisco, CA (US)

( * ) Notice: Subject to any disclaimer, the term of this patent is extended or adjusted under 35 U.S.C. 154(b) by 0 days.

(21) Appl. No.: 09/295,000

(22) Filed: Apr. 16, 1999

Related U.S. Application Data

(63) Continuation-in-part of application No. 08/956,743, filed on Oct. 24, 1997, now Pat. No. 6,370,139.

(51) Int. Cl.
*H04L 12/56* (2006.01)

(52) U.S. Cl. .................. 370/390; 709/203; 725/93
(58) Field of Classification Search .............. 370/352, 370/354, 390; 707/9, 10; 709/203, 217, 709/218, 219; 725/93, 96
See application file for complete search history.

(56) References Cited

U.S. PATENT DOCUMENTS

| | | | |
|---|---|---|---|
| 3,599,178 A | 8/1971 | Jackson et al. | 340/172.5 |
| 3,746,780 A | 7/1973 | Stetten et al. | 178/6.6 A |
| 4,009,344 A | 2/1977 | Flemming | 179/15 BS |
| 4,009,346 A | 2/1977 | Parker et al. | 179/15 AQ |
| 4,028,733 A | 6/1977 | Ulicki | 360/10 |
| 4,062,043 A | 12/1977 | Zeidler et al. | 358/86 |
| 4,071,697 A | 1/1978 | Bushnell et al. | 179/2 TV |
| 4,122,299 A | 10/1978 | Cannon | 178/26 A |
| 4,206,316 A | 6/1980 | Burnsweig et al. | 178/66.1 |
| 4,295,154 A | 10/1981 | Hata et al. | 358/4 |
| 4,381,522 A | 4/1983 | Lambert | 358/86 |
| 4,400,717 A | 8/1983 | Southworth et al. | 358/13 |
| 4,450,477 A | 5/1984 | Lovett | 358/86 |
| 4,506,387 A | 3/1985 | Walter | 455/612 |
| 4,518,989 A | 5/1985 | Yabiki et al. | 358/86 |
| 4,521,806 A | 6/1985 | Abraham | 358/86 |
| 4,528,589 A | 7/1985 | Block et al. | 358/122 |
| 4,538,176 A | 8/1985 | Nakajima et al. | 358/86 |
| 4,567,359 A | 1/1986 | Lockwood | 235/381 |
| 4,567,512 A | 1/1986 | Abraham | 358/86 |
| 4,578,535 A | 3/1986 | Simmons | 179/2 DP |
| 4,590,516 A | 5/1986 | Abraham | 358/86 |
| 4,647,989 A | 3/1987 | Geddes | 360/55 |
| 4,659,876 A | 4/1987 | Sullivan et al. | 379/96 |
| 4,661,952 A | 4/1987 | von Sichart et al. | 370/94 |

(Continued)

FOREIGN PATENT DOCUMENTS

EP    0 355 697 A2    2/1990

(Continued)

*Primary Examiner*—Melvin Marcelo
(74) *Attorney, Agent, or Firm*—Carr & Ferrell LLP

(57) ABSTRACT

A server/client media file distribution system is provided in which the server system is adapted to receive transmission requests from clients, status information from a network, and protocol information from each client. The server, based upon this information, adaptively transmits a given media file stored therein to one or more clients using the optimal transmission speed and/or network protocol based on the network status information and protocol information. Additionally, the present invention provides a looping file arrangement in which a plurality of clients can receive the same media file on multiple network channels, without the need to provide multiple copies of the same media file for each request of that file.

18 Claims, 14 Drawing Sheets

U.S. PATENT DOCUMENTS

| | | | |
|---|---|---|---|
| 4,665,516 A | 5/1987 | Middleton et al. | 370/76 |
| 4,679,079 A | 7/1987 | Catros et al. | 358/135 |
| 4,688,246 A | 8/1987 | Eilers et al. | 380/9 |
| 4,689,683 A | 8/1987 | Efron | 358/185 |
| 4,703,348 A | 10/1987 | Yuasa et al. | 358/133 |
| 4,714,989 A | 12/1987 | Billings | 364/200 |
| 4,734,765 A | 3/1988 | Okada et al. | 358/102 |
| 4,736,407 A | 4/1988 | Dumas | 379/96 |
| 4,748,511 A | 5/1988 | Nichols et al. | 358/256 |
| 4,750,036 A | 6/1988 | Martinez | 358/147 |
| 4,755,872 A | 7/1988 | Bestler et al. | 358/86 |
| 4,760,442 A | 7/1988 | O'Connell et al. | 358/86 |
| 4,763,191 A | 8/1988 | Gordon et al. | 358/86 |
| 4,764,870 A | 8/1988 | Haskin | 364/415 |
| 4,769,833 A | 9/1988 | Farleigh et al. | 379/105 |
| 4,785,349 A | 11/1988 | Keith et al. | 358/136 |
| 4,789,863 A | 12/1988 | Bush | 340/825.35 |
| 4,792,849 A | 12/1988 | McCalley et al. | 358/86 |
| 4,807,023 A | 2/1989 | Bestler et al. | 358/86 |
| 4,818,984 A | 4/1989 | Chang et al. | 340/825.54 |
| 4,833,710 A | 5/1989 | Hirashima | 380/20 |
| 4,845,658 A | 7/1989 | Gifford | 364/900 |
| 4,847,677 A | 7/1989 | Music et al. | 358/13 |
| 4,847,827 A | 7/1989 | Hayashi et al. | 369/284 |
| 4,868,653 A | 9/1989 | Golin et al. | 358/133 |
| 4,890,320 A | 12/1989 | Monslow et al. | 380/10 |
| 4,907,081 A | 3/1990 | Okamura et al. | 358/133 |
| 4,914,508 A | 4/1990 | Music et al. | 358/13 |
| 4,920,432 A | 4/1990 | Eggers et al. | 360/33.1 |
| 4,937,821 A | 6/1990 | Boulton | 370/124 |
| 4,947,244 A | 8/1990 | Fenwick et al. | 358/86 |
| 4,949,169 A | 8/1990 | Lumelsky et al. | 358/86 |
| 4,949,187 A | 8/1990 | Cohen | 358/335 |
| 4,963,995 A | 10/1990 | Lang | 358/335 |
| 4,991,208 A * | 2/1991 | Walker et al. | 380/239 |
| 5,014,267 A | 5/1991 | Tompkins et al. | 370/62 |
| 5,032,927 A | 7/1991 | Watanabe et al. | 358/335 |
| 5,036,518 A | 7/1991 | Tseung | 371/32 |
| 5,057,932 A | 10/1991 | Lang | 358/335 |
| 5,077,830 A | 12/1991 | Mallia | 455/58 |
| 5,093,718 A | 3/1992 | Hoarty et al. | 358/84 |
| 5,130,792 A | 7/1992 | Tindell et al. | 358/85 |
| 5,132,992 A | 7/1992 | Yurt et al. | 375/122 |
| 5,133,079 A | 7/1992 | Ballantyne et al. | 455/4.1 |
| 5,164,839 A | 11/1992 | Lang | 358/335 |
| 5,191,573 A | 3/1993 | Hair | 369/84 |
| 5,195,092 A | 3/1993 | Wilson et al. | 371/94.2 |
| 5,247,664 A | 9/1993 | Thompson et al. | 395/600 |
| 5,253,275 A | 10/1993 | Yurt et al. | 375/122 |
| 5,262,875 A | 11/1993 | Mincer et al. | 358/335 |
| 5,420,942 A | 5/1995 | Levit | 382/276 |
| 5,440,334 A | 8/1995 | Walters et al. | 348/6 |
| 5,550,577 A | 8/1996 | Verbiest et al. | 348/7 |
| 5,550,863 A | 8/1996 | Yurt et al. | 375/240 |
| 5,557,320 A | 9/1996 | Krebs | 348/12 |
| 5,583,561 A | 12/1996 | Baker et al. | 348/7 |
| 5,606,359 A | 2/1997 | Youden et al. | 348/7 |
| 5,608,448 A | 3/1997 | Smoral et al. | 348/7 |
| 5,675,734 A | 10/1997 | Hair | 395/200 |
| 5,710,970 A | 1/1998 | Walters et al. | 455/3.1 |
| 5,727,002 A | 3/1998 | Miller et al. | 371/32 |
| 5,734,781 A | 3/1998 | Cantone | 386/46 |
| 5,778,187 A | 7/1998 | Monteiro et al. | 395/200.61 |
| 5,805,804 A | 9/1998 | Laursen et al. | 395/200.02 |
| 5,809,145 A | 9/1998 | Slik et al. | 380/25 |
| 5,818,512 A | 10/1998 | Fuller | 348/8 |
| 5,826,261 A | 10/1998 | Spencer | 707/5 |
| 5,832,499 A | 11/1998 | Gustman | 707/103 |
| 5,841,979 A | 11/1998 | Schulhof et al. | 395/200.67 |
| 5,859,972 A | 1/1999 | Subramaniam et al. | 395/200.33 |
| 5,881,232 A | 3/1999 | Cheng et al. | 395/200.47 |
| 5,884,312 A | 3/1999 | Dustan et al. | 707/10 |
| 5,890,129 A | 3/1999 | Spurgeon | 705/4 |
| 5,966,440 A | 10/1999 | Hair | 380/4 |
| 7,073,191 B2 * | 7/2006 | Srikantan et al. | 725/87 |
| 2007/0083667 A1 * | 4/2007 | Cooper | 709/231 |

FOREIGN PATENT DOCUMENTS

| | | |
|---|---|---|
| WO | WO 84/00863 | 1/1984 |
| WO | WO 89/12370 | 12/1989 |

* cited by examiner

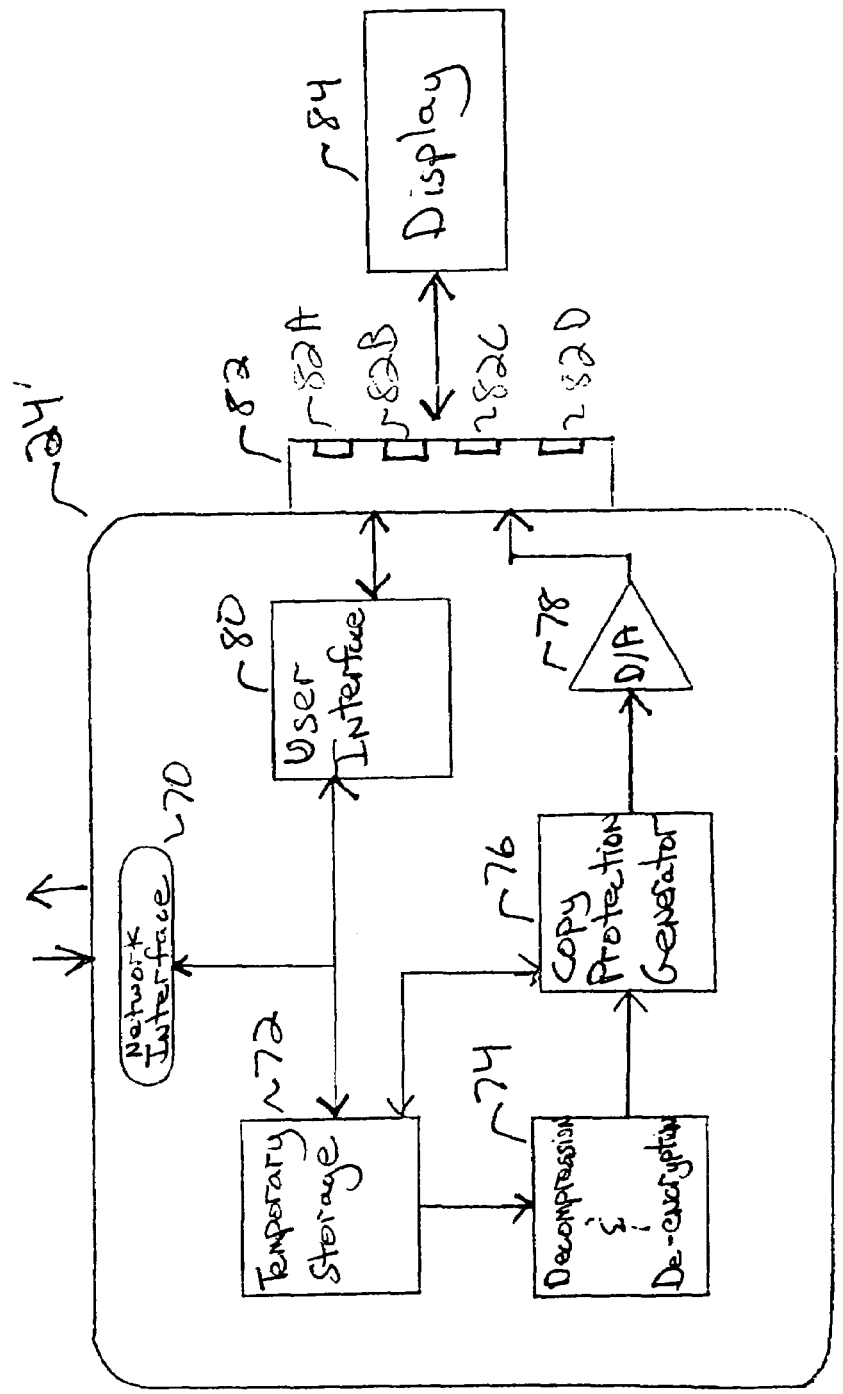

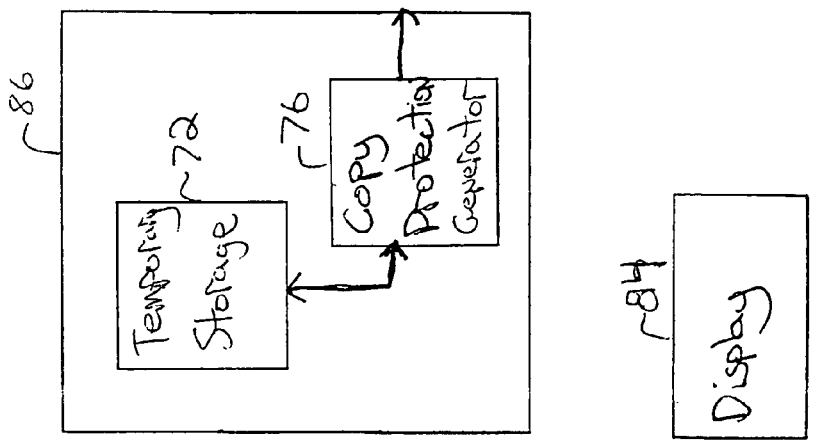
Figure 6A
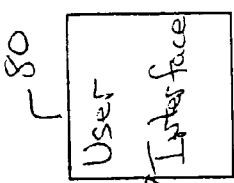
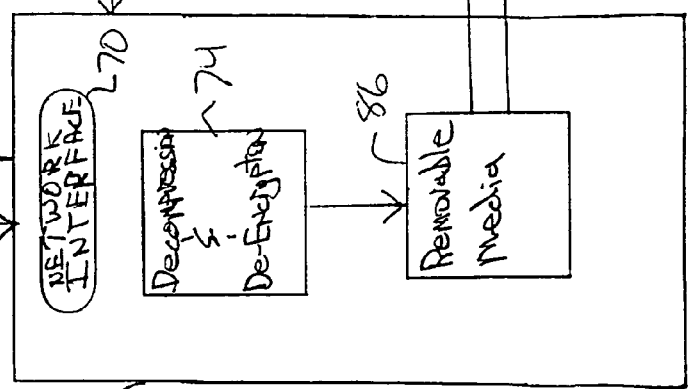
Figure 6

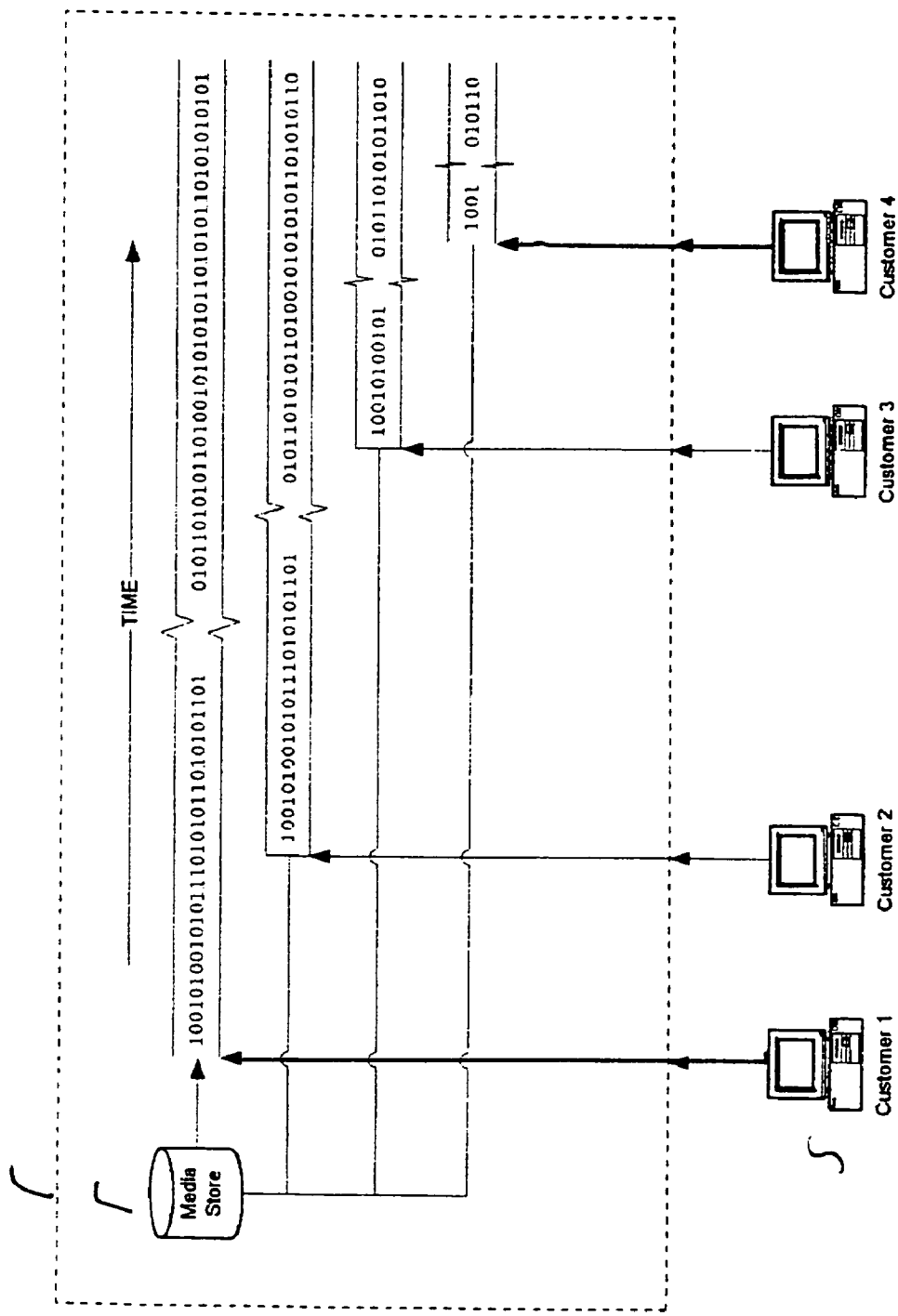
Figure 9A - Prior Art

MEDIA FILE DISTRIBUTION WITH ADAPTIVE TRANSMISSION PROTOCOLS

The present invention is a continuation-in-part of patent application Ser. No. 08/956,743 filed Oct. 24, 1997 now U.S. Pat. No. 6,370,139 and assigned to the same assignee.

BACKGROUND OF THE INVENTION

1. Field of the Invention

The present invention relates to media file distribution, and, more particularly, to a media file distribution system with adaptive transmission protocols in a networked client/server environment which provides automated, highly compressed, user-selectable media file distribution. Particular utility of the present invention is in less-than real-time server-client audio/video file distribution over conventional networks; although the present invention has equal utility in still image and/or high-resolution image file data distribution (e.g., x-ray, MRI, etc.).

2. Description of Related Art

Multimedia file distribution systems, which include distribution of audio and/or video information, are well known in the art. Examples include video-on-demand systems and network-based real-time streaming video systems and methodologies. Recent developments in high-speed network communications (e.g., ISDN, DSL, cable modems, etc.) have permitted the development of real-time streaming video data distribution in a client/server environment. Such systems typically employ extensive video file server systems that can transmit streaming video file data directly to a user's television set or PC (via, for example, Internet communications protocols (e.g., TCP/IP connections based on HTTP or FTP file transfer protocols). These systems typically transmit a separate copy of the streaming video file to each receiver. This uses additional network bandwidth for each additional receiver. This can quickly lead to saturated networks, degrading the quality of the streaming video received, as well as impacting other users and uses of the network. Examples of such file distribution systems are described in U.S. Pat. Nos. 5,132,992; 5,253,275; and 5,550,863 issued to Yurt et al., and hereby incorporated by reference.

Conventional file transfer techniques use either the Transmission Control Protocol (TCP) or User Datagram Protocol (UDP) for the transmission of the data. These two protocols are part of the standard TCP/IP protocol suite. TCP is a connection-based protocol, meaning that there is a logical connection opened between the two systems involved in the transfer. Because of the connection, and the TCP protocol process, this connection is a "reliable connection." This means that packets are guaranteed to be received, intact and in order, or the connection is broken. Examples of common use of TCP would be browsing on the World Wide Web, File Transfer Protocol, sending and reading email, etc.

UDP is a connectionless protocol, meaning that there is no open connection as you would find in a TCP session. Packets are transmitted by the sender and addressed to the receiver. UDP is not a "Reliable protocol". Packets in a UDP session, may be received out of sequence and may even be lost. Applications must either accept this loss, or implement some other means for ensuring reliability. Examples of common use of UDP would be Domain Name Service queries, RealAudio/RealVideo, network management functions, etc. Both TCP and UDP are designed for use between two systems. UDP can also be used for "Broadcast". Broadcast packets are limited to a single Local Area Network (LAN), and so will not cross any routers connected to that LAN.

Current development in the area of IP Multicasting are improving the art in areas such as reliability, performance, session management, network management, statistical research, router management, routing protocols, and other areas required for the smooth operation of IP Multicasting on public networks (e.g., The Internet). However, this art has not overcome the aforementioned problems: either the bandwidth requirements for multiple client access are too large, or the transmission protocol becomes unreliable. Moreover, the prior art is incapable of providing a system which can analyze client transmission demands and adaptively adjust the transmission protocols to most effectively accommodate a plurality of users.

SUMMARY OF THE INVENTION

Accordingly, the present invention solves the aforementioned drawbacks of the prior art by providing a server/client media file distribution system in which the server system is adapted to receive transmission requests from clients. The server also receives status information from a network, and protocol information from each client. The server, based upon this information, adaptively transmits a given media file stored therein to one or more clients using the optimal transmission speed and/or network protocol based on the network status information and protocol information.

In the preferred system, the present invention provides a media file distribution system having a file distribution server system comprising a media file archive database in communication with one or more users over a network, said media file archive comprising one or more precompressed and pre-encrypted media data files, said server being for receiving one or more transmission requests for a selected media file from a plurality of users, the improvement comprising a file distribution system being adapted to receive a plurality of said transmission requests from a plurality of users, the transmission protocols of said plurality of said users and status information from said network and optimally simultaneously transmit said media file to each user based on said transmission protocols and said status information.

Additionally, the present invention provides a looping file arrangement in which a plurality of clients can receive the same media file on multiple network channels, without the need to provide multiple copies of the same media file for each request of that file. Also, the present invention provides multiple-level encryption technology that permits the server system to fully control both access and use of a given media file.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 5 is a block diagram of one embodiment of the media file playback system of the present invention;

FIG. 6 is a block diagram of another embodiment of the media file playback system of the present invention.

FIG. 9A is a block diagram of convention network data transmission;

It will be appreciated by those skilled in the art that although the following Detailed Description will proceed with reference being made to preferred embodiments, the present invention is not intended to be limited to these embodiments. For example, it should be understood from the outset that although preferably the functional components of the preferred embodiments of the system of the present invention are embodied as one or more distributed computer program processes running on one or more conventional general purpose computers (e.g., IBM-compatible, Apple MacIntosh, and/or RISC microprocessor-based computers), conventional telecommunications (e.g., modem and/or ISDN means), networked together by conventional network hardware and software, other types of computers and network resources may be used without departing from the present invention. It should also be understood that the media file playback devices herein described can be embodied in various hardware forms, including: RAM/ROM drives, removable and/or permanent disk drives (including, but not limited to, hard disk drives, Jazz drives, and/or other removable media known in the art). Furthermore, it should be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention as defined only by the hereinafter appended claims.

Additionally, as used herein, the term "Unicast" describes a file transfer session between a single server and a single client receiver, using either TCP or UDP. The term "Multicast" (or more specifically "IP Multicast") describes a file transfer session between a single server and a plurality of client receivers. Because of the additional clients, all Multicast sessions must be based on the UDP protocol as the TCP protocol specification does not allow for more than two endpoints for the connection.

DETAILED DESCRIPTION OF PREFERRED EMBODIMENTS

Figure 1:
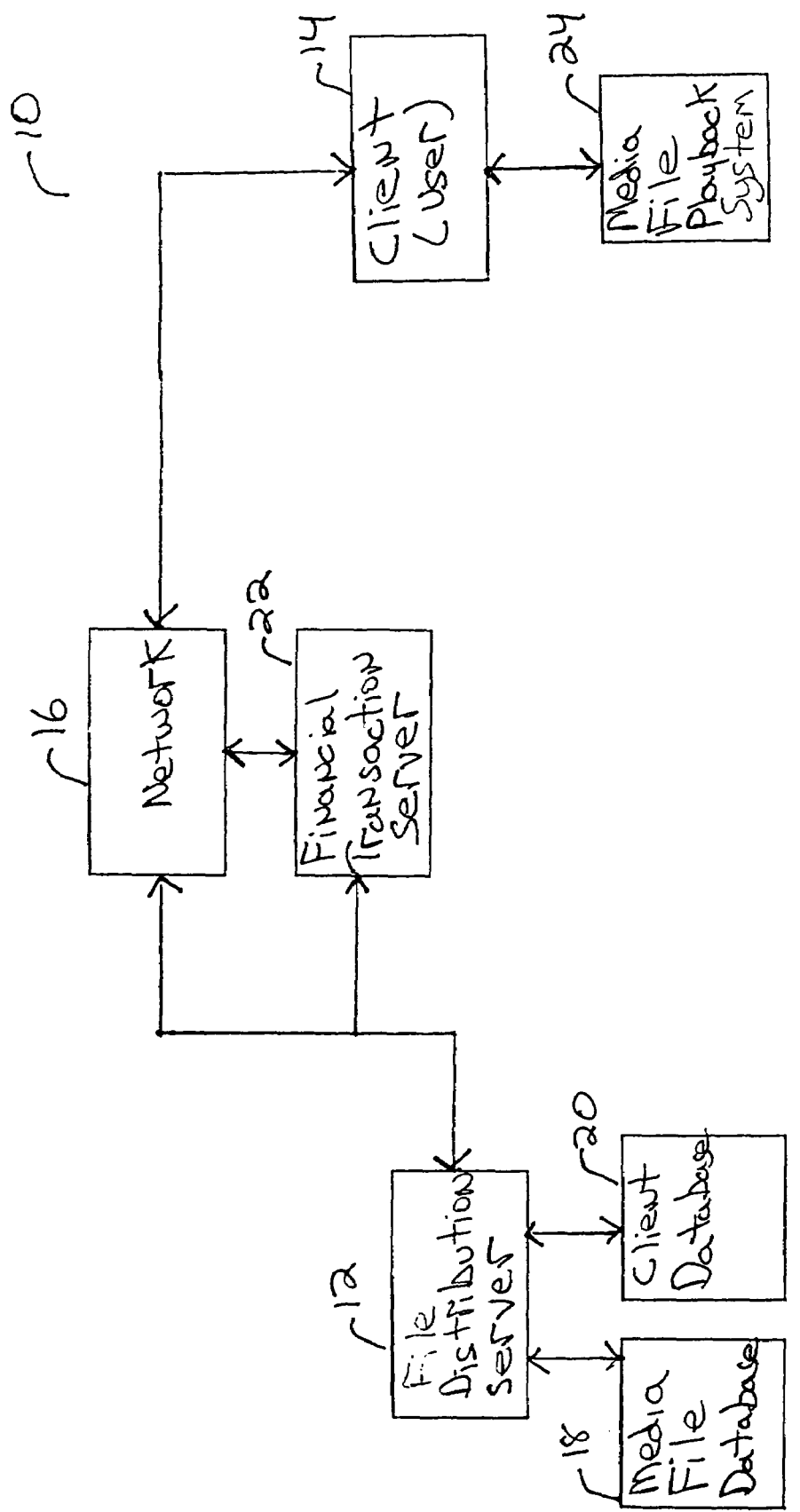
FIG. 1 is a block diagram of the media file client/server system of the present invention.

FIG. 1 is a block diagram of the media file client/server system of the present invention. Shown in FIG. 1 is a file distribution server 12 (which includes media file database system 18 and client database 20), a client (user) system 14 (which includes a media file playback system 24), connected via a network system 16. As an overview, the present invention is intended to provide media file distribution in a server/client environment. Media files can be any of feature films, television programs, audio files, or any other combination of audio and/or video programming. Further, media files can also contain non-media data. The following detailed description will be in reference to audio/video file distribution, and in particular, to full-length video file (i.e., feature film) distribution. The present invention is intended to permit a user to access the file distribution server, order an event (a movie), pay for the transaction via the financial transaction server 22 (more fully described in copending application serial number 956,743), and receive the movie for later playback in one of a plurality of user playback devices. The present invention is preferably adapted to permit less-than real-time transmission of media files to one or more users using current networking technology (i.e., 28.8 and 56K modem technology) without having expensive and/or proprietary networking requirements placed on the user (i.e., such as those required by video-on-demand systems). Each of the functional components depicted in FIG. 1 are discussed more fully below.

It should be understood at the outset that the present invention advantageously utilizes storage and transmission of precompressed and pre-encrypted file data (hereinafter referred to as "media file archive"), thereby eliminating the need for extensive processing power required for "on-the-fly" compression and encryption of media file data. This advantage is especially useful for full-length video files which, along with a soundtrack, would require massive amounts of storage to hold in an uncompressed form. In addition, by providing an array of media files in precompressed format, the present invention is adapted to permit multiple, simultaneous download of a single media file, as will be described below. In addition, the preferred system of the present invention incorporates pre-encrypted media file data stored in the media file database. The encryption/de-encryption process (digital copy protection), described more fully below, preferably includes conventional and/or proprietary encryption algorithms that require users to obtain a valid decryption key for a given media file transmitted.

Figure 2:
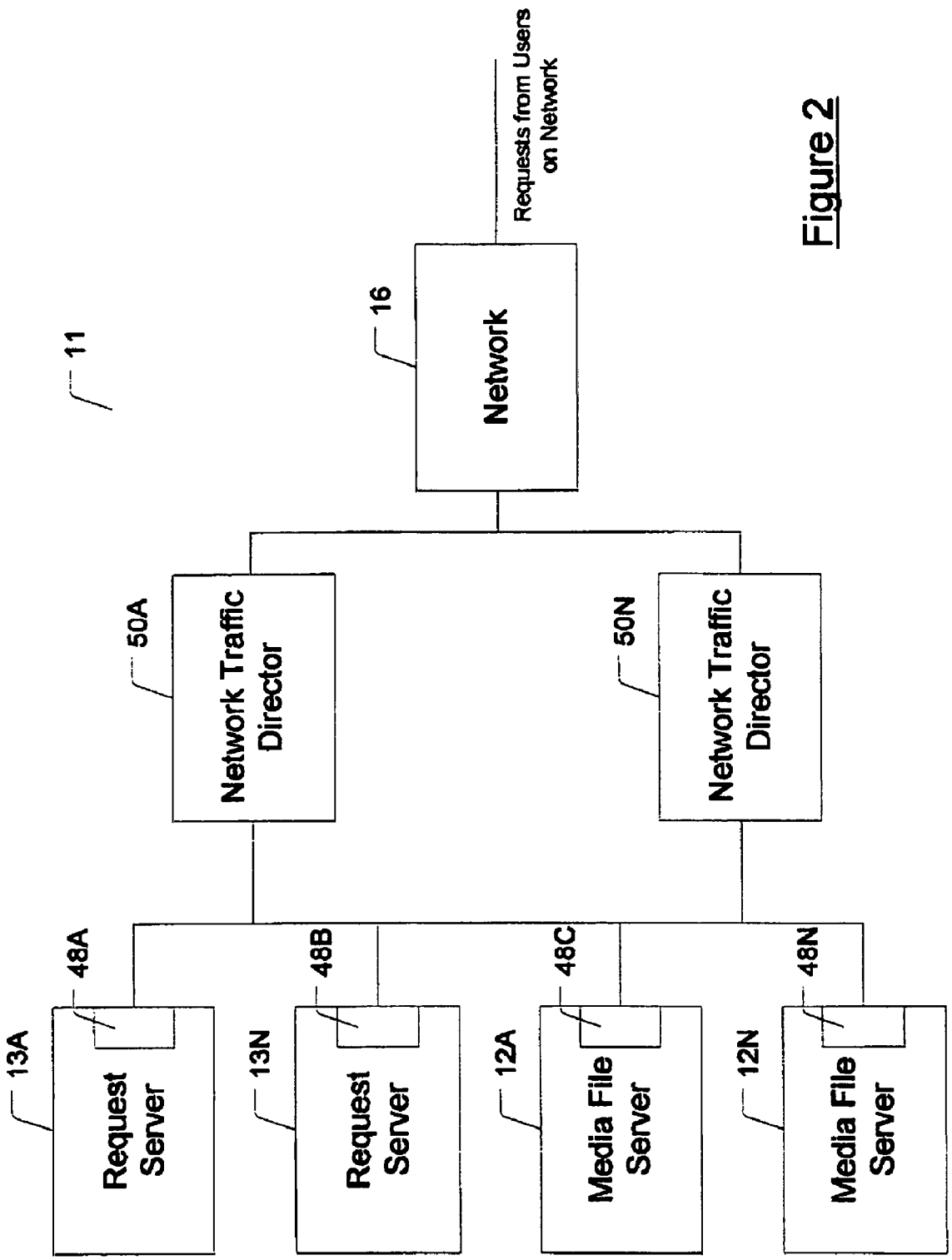
FIG. 2 is a block diagram of the preferred network arrangement of the file distribution server system of the present invention.

FIG. 2 depicts the preferred file distribution server arrangement of the present invention. Preferably, file distribution server installation 11 is comprised of a plurality (11A, 11B . . . 11N) of individual installations, each being located in geographically diverse areas, on individual power grids, e.g., each being located in a separate city, or within the same city on different power grids, thereby permitting the present invention to be fault-tolerant and maintain service to users in the event one or more servers should become off-line. Preferably each file distribution server installation is comprised of a plurality of request servers (13A, 13B . . . 13N), and a plurality of media file servers (12A, 12B . . . 12N). Each server (12 and 13) is preferably adapted with appropriate an network interface 48A . . . 48N to permit one or more users access to the corresponding server over the network 16. Those skilled in the art will recognize that network interface 48A . . . 48 N can include of standard and/or proprietary networking hardware/software (e.g., TCP/IP networking hardware/software). Network 16 preferably includes a standard TCP/IP network (e.g., world wide web). Each server is also preferably adapted with conventional firewall hardware/software (not shown) to prevent unauthorized user access to media files stored therein. Also as shown in FIG. 2, each server 12A . . . 12N is preferably in communication with the network traffic directors 50A . . . 50N, via a heartbeat link. The heartbeat link is a status signal providing each server's respective status information, e.g., on-line/off-line, network overflow, user request data, etc. This heartbeat signal allows the network traffic director to route incoming requests to an operational server (12 and 13) able to service the request. In the event of a server failure, the network traffic director 50A . . . 50N will detect the failure and transfer the requests being handled by that server to another server (12 or 13) able to continue processing the request. Multiple network traffic directors 50A . . . 50N are included in the preferred embodiment to prevent the network traffic director from becoming a single point of failure. Each network traffic director 50A . . . 50N is active and handling requests. In the event of a network traffic director failure, the remaining network traffic directors will take over the additional load automatically. Thus, network traffic director 50A . . . 50N is adapted to receive network status messages, heartbeat link status messages, and individual user request messages, preferably in real-time, to permit the network traffic director to route incoming requests based on these criteria. Additionally, the traffic director monitors the transmission protocol and transmission speed of each client, and uses this information to optimally transmit a given media file to one or more clients.

As shown in FIG. 2, requests from users are received by the network traffic director 50A . . . 50N, which forwards those requests to the request server 13A . . . 13N. The response is sent back to the user by the request server. This response includes information of the client software used to contact the media file server 12A . . . 12N. The media file server transmits the requested media file using industry standard and/or proprietary network protocols. These protocols are described further below. Media file server 12A . . . 12N is adapted to monitor the incoming user request messages and determine an overall throughput value based on the current users' transmission speed. In addition, the media file server 12A . . . 12N will monitor network performance during the transmission of the media file, adapting the transmission speed to optimally accommodate the transmission speeds of all the users currently viewing the media file. Thus, the transmission speed of the server can be automatically adjusted based on the average throughput speed of the users currently in communication with the server, and/or based on the lowest transmission speed available (thereby providing transmission at a least common denominator speed). The preferred embodiment includes multiple transmissions for each media file, each being at different speeds. These channels allow users to receive data from the channel most closely matching the throughput of their connection. This also allows high-speed client systems to be segregated from the lower-speed systems. This segregation provides the optimal throughput for each user. Although not shown in the drawings, each server (12 and 13) and network traffic director 50 preferably includes a back-up power supply (e.g. battery back-up power supply system) to permit the device to achieve the stated functionality in the event of a power failure, without interrupting service to the users connected thereto. To that end, each device is adapted to monitor the status of the back-up power supply and, when enabled, provide a "fail-over" to another on-line server capable of providing the required functionality.

Figure 3:
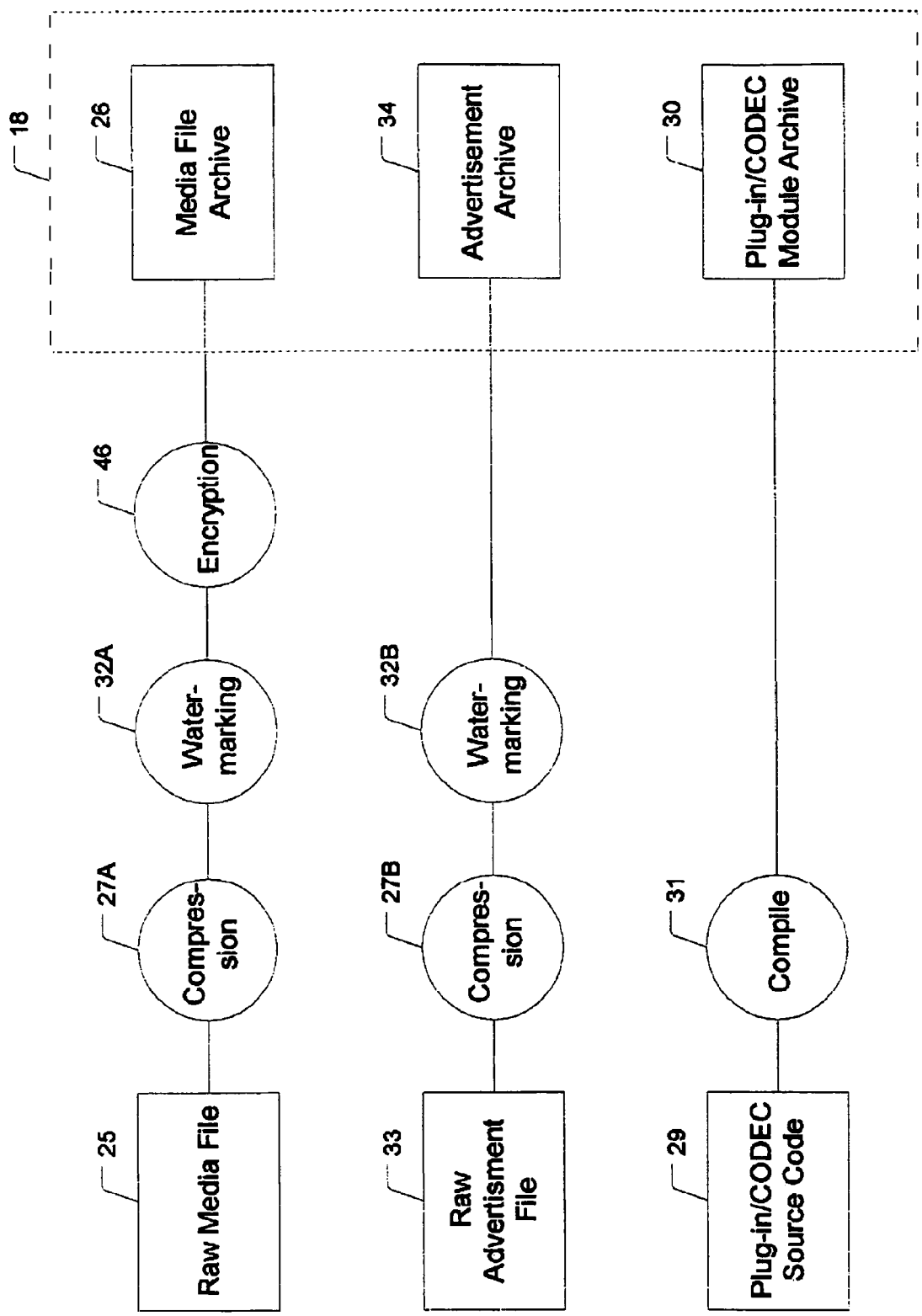
FIG. 3 is a block diagram of the preferred media file database system of the present invention.

Turning to FIG. 3, the processing steps necessary to create the media file archive 26, advertisement archive 34, and plug-in archive 30 elements for storage in the media file database 18 is depicted. The data is divided into blocks or frames, each frame having a header and payload section. The header information is normally not processed, but contains information about the processing applied to that frame. The data payload is what is actually processed. To create the media file archive 26, the raw media file 25 is preferably processed using compression technology 27A. This compression technology includes one or more of a variety of compression techniques, including MPEG I, II, IV, and/or other compression techniques known in the art, or may include proprietary and/or custom compression algorithms (such as provided by Iterated Systems, Inc, or as described in U.S. Pat. No. 5,420,942, hereby incorporated by reference).

Although optional, nearly all media files will be compressed. The compressed file is then preferably processed to add a digital watermark 32A. Not all files will require watermarking, and in fact some files must not be watermarked. In these cases, the watermark process is bypassed. The watermark, if applied, provides source identification used to identify the file later. Further processing provides digital protection of the media file by encrypting it using strong encryption algorithms 46 such as CAST-128, IDEA, Triple-DES, or other high-grade encryption technology. Not all, but most media files will require encryption. The resulting media file archive 26, which has been optionally compressed, watermarked, and encrypted, is stored in the media file database 18 associated with a collection of media file distribution servers 12.

Also shown on FIG. 3, media files provided by advertisers are also processed using compression 27B and watermarking 32B, providing the same benefits as described above. Advertisements are not encrypted. The resulting advertisement archive 34 is stored in the media file database 18 for later retrieval. For example, the watermark can include identification information (which may include, for example, originating ownership information of a given media file, etc.) and may also include copyright notice information. Module 34 is provided for those suppliers of media file data who also wish to include a trailing or ending advertisement, which is incorporated into a media file upon transmission to a user. To that end, module 34 also includes an updatable database (not shown) which contains advertisements, and also association parameters that can direct certain advertisements to be incorporated with certain media files. Thus, the present invention permits advertisers to provide advertisement data to the system. The advertisers can choose which media file(s) their ads are to be associated with, and those associations are preferably automatically affixed to the appropriate media file upon transmission. The advertising data can be affixed to the media file as a trailer and/or leader. Modules 28 and 30 are discussed more fully below with reference to FIG. 8.

Also shown on FIG. 3, plug-in and CODEC program source files 29 are processed and compiled 31 to produce a plug-in and CODEC module archive 30 which is stored in the media file database 18. As executable programs, they can be neither watermarked or encrypted, as such processing would render them unusable.

The encryption module 46 processes the media file by generating a random key which becomes the master key for the file. This master key is saved in a key database (not shown). For each block, a new random frame key is generated. This key is combined with the master key and the resulting key used to encrypt the payload of the frame. The frame key is saved in the frame header. This information will be used later to decrypt the data payload, a process described below with reference to FIG. 10.

Figure 4A:
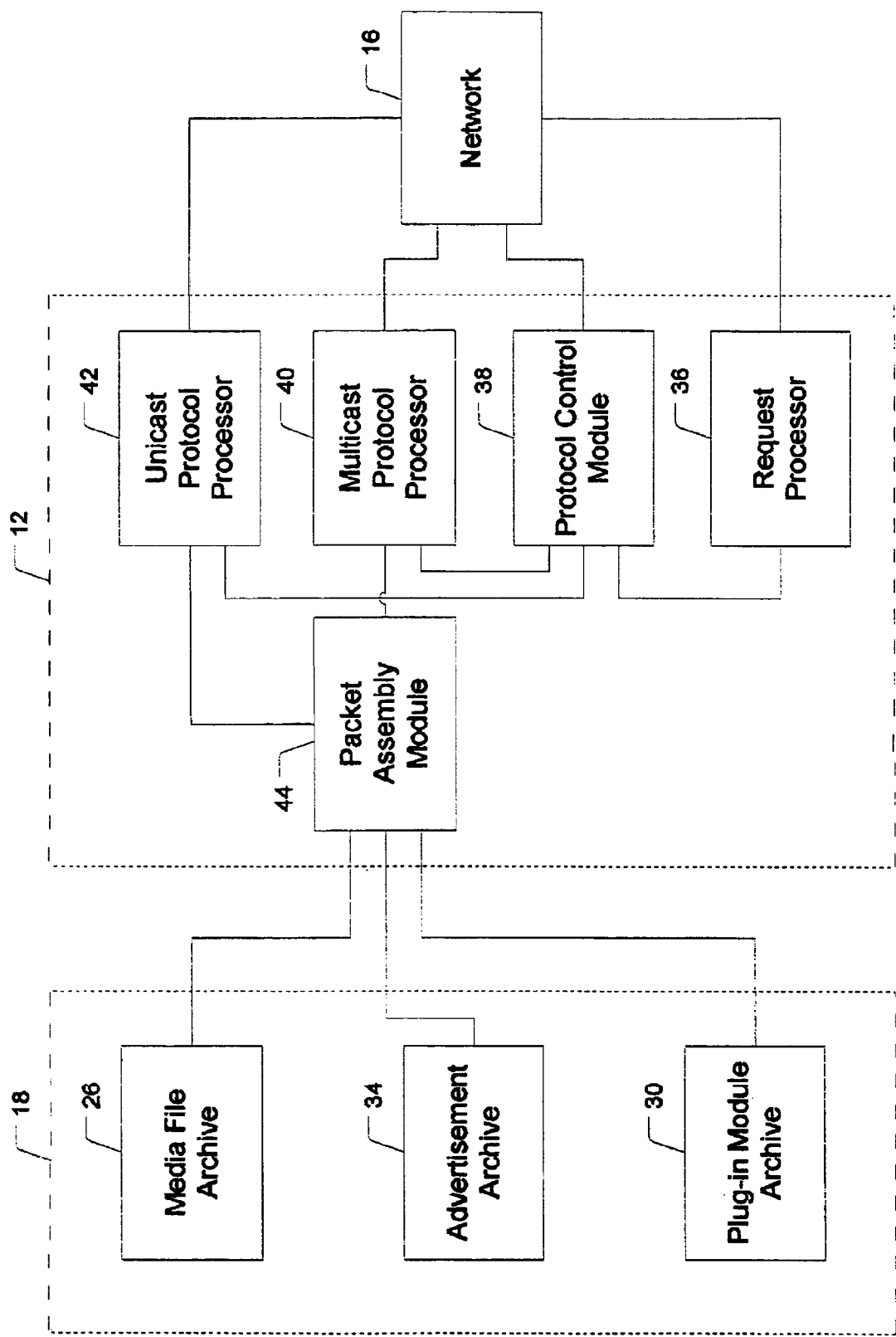
FIG. 4A is a block diagram of the preferred media file distribution system of the present invention.

FIG. 4A depicts the preferred embodiment of the file distribution server 12 and the relationships between that server and the media file database 18. As an overview, the present invention is adapted to permit multiple users access to the same media file (e.g., movie, image, etc.), thereby eliminating the need for multiple copies of a single media file. Further, the preferred embodiment of the file distribution server 12 uses network software and protocols to allow multiple users to access the same media file stream, reducing the network bandwidth required, thus reducing the impact on the Network. In the present invention, n-requests for media file content are transmitted by n-users over the network and received at the appropriate server (or, rerouted to a server having the selected media file), and are received by the request processor 36 running on that server. Each request is for a single media file archive, advertisement archive, or media plug-in or CODEC. Multiple requests can be issued by a client system, each to be processed by the server and handled individually.

The requests are processed and passed to the protocol control module 38 for further processing in preparation for transmission. The protocol control module preferably passes the request to the multicast protocol processor 40, which attempts to establish a multicast pathway between the customer system 14 and the media file server 12. If a multicast connection cannot be established, for whatever reason (e.g., lack of multicast support by the Internet Service Provider used by the customer system 14 to connect to the Internet), the protocol control module will pass the request to the unicast protocol processor 42 for establishment of a connection using the User Datagram Protocol (UDP), which is part of the standard TCP/IP network support.

Once the data connection is established, whether by multicast or unicast, the appropriate protocol processing module requests packets of information from the packet assembly module 44. The information necessary to assemble the packets for transmission is retrieved from the appropriate section of media file database 18. Further clarification of this process is provided below with reference to FIG. 4C.

Figure 4B:
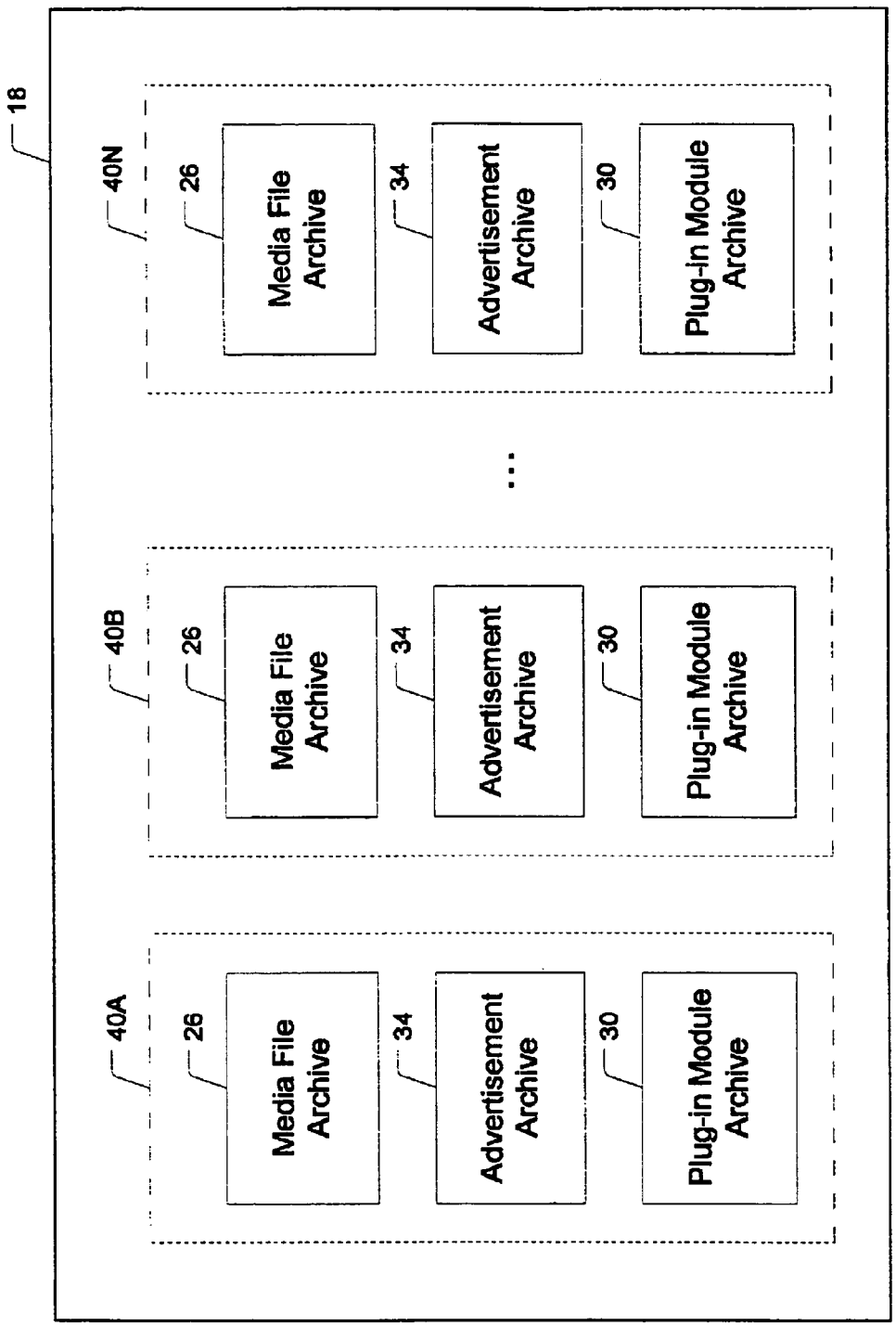
FIG. 4B is a flow chart diagram of the preferred media file distribution system of FIG. 4A.

Referring to FIG. 4b, the preferred embodiment the media archive database 18 is stored on media file storage device 40. In the preferred embodiment, the media file storage device 40 includes a plurality of media file storage devices 40A . . . 40N, consisting of one or more archive systems, for example, CD-ROM/DVD-ROM media devices, hard drive devices, or other digital media storage devices.

Figure 4C:
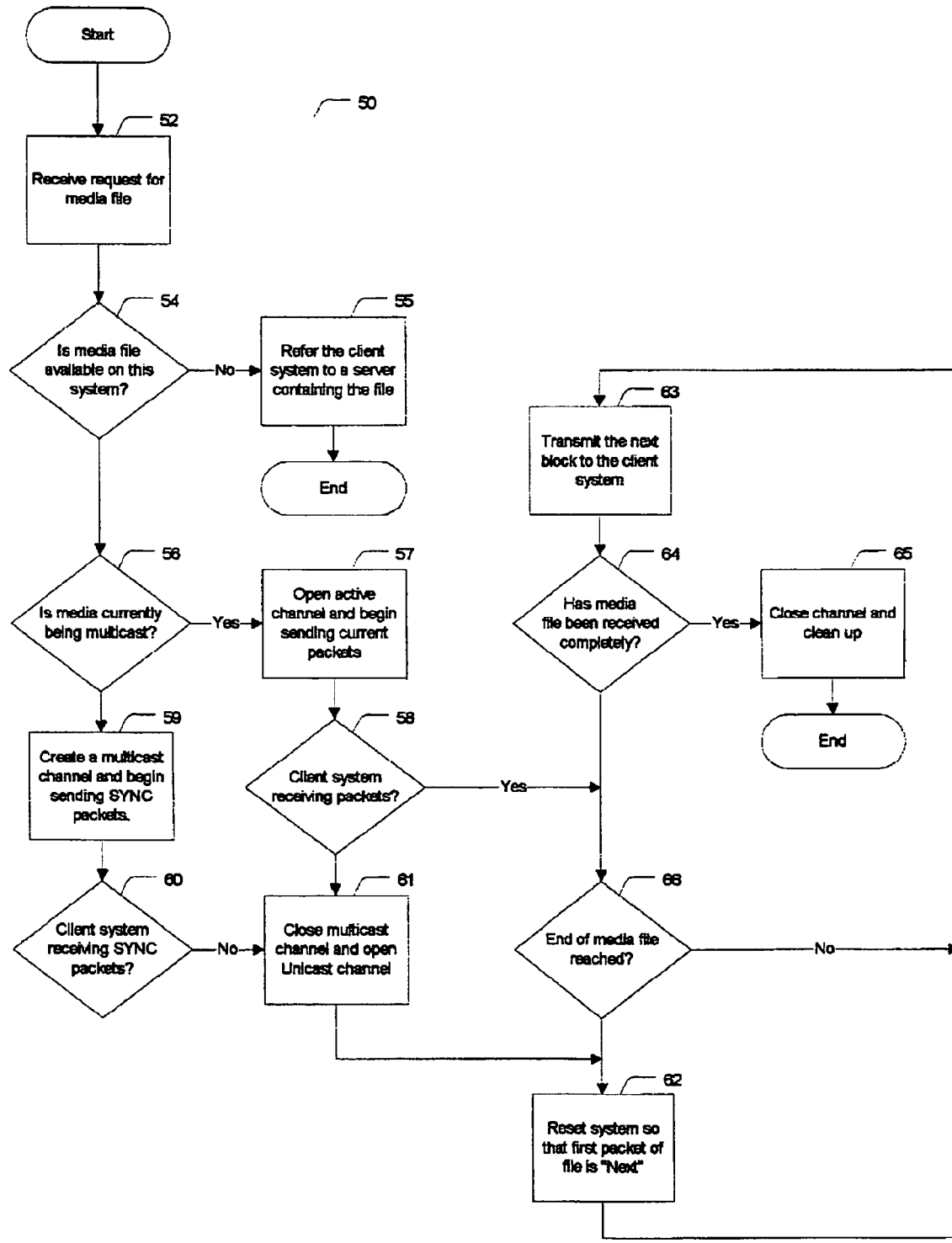
FIG. 4C is a flow chart diagram of the preferred media file transmission protocol of the present invention.

Referring to FIG. 4C, the steps for processing requests is described as follows. The operational flow 50 contains the flow of processing, while FIG. 4A shows the relationship between the subsystems of the media file server. Requests are received 52 by the request processor 36. If the requested file is not available on this server 54, the client system is redirected to a server with the requested file 55. The request is passed to the protocol process module 38. This modules controls the establishment of the network connection between the file distribution server 12 and the customer system 14. Preferably, this connection will use a multicast protocol, if possible. Thus, the multicast protocol module is invoked (if possible) to establish the multicast channel. First, the active channel list is consulted to determine if the requested event is already active on a multicast channel 56. If so, the channel information is sent to the client system 57. The client system uses this information to open the multicast channel using standard IP multicasting protocols such as DVMRP and PIM. If the event is not currently being transmitted, a new multicast channel is created, and synchronization packets are sent on this channel 59. These SYNC packets give the client system 14 something to verify receipt of data on the multicast channel without actually beginning the event until it is certain the data can be received. If the client system is not able to begin receiving the multicast data within a given timeframe 58 and 60, the unicast protocol module is invoked in an attempt to use the UDP protocol instead 61.

Once the channel is opened, data packets for the event are assembled by the packet assembly module 44, which is sent to the multicast protocol module 40 and unicast protocol module 42 for transmission on active channels for that event. For efficiency, the same packets are used for transmitting to all open channels for the event, whether they are multicast or unicast channels.

The same data stream is received by all client systems 14 actively receiving the event. Each client system will have started receiving the event data at a different point in data stream. The event data stream continues to be transmitted until the end of the event is reached 66. At this time, the event data stream is restarted from the beginning 62. Client systems continue to receive the event data until they have received the entire event 64. As each client completes the event, these clients systems notify the appropriate protocol module of the change in status 65. The "Loop" continues until all active client systems have completely received the event data. When there are no active clients monitoring a channel, the event data transmission is stopped and the channel is closed.

Figure 4D:
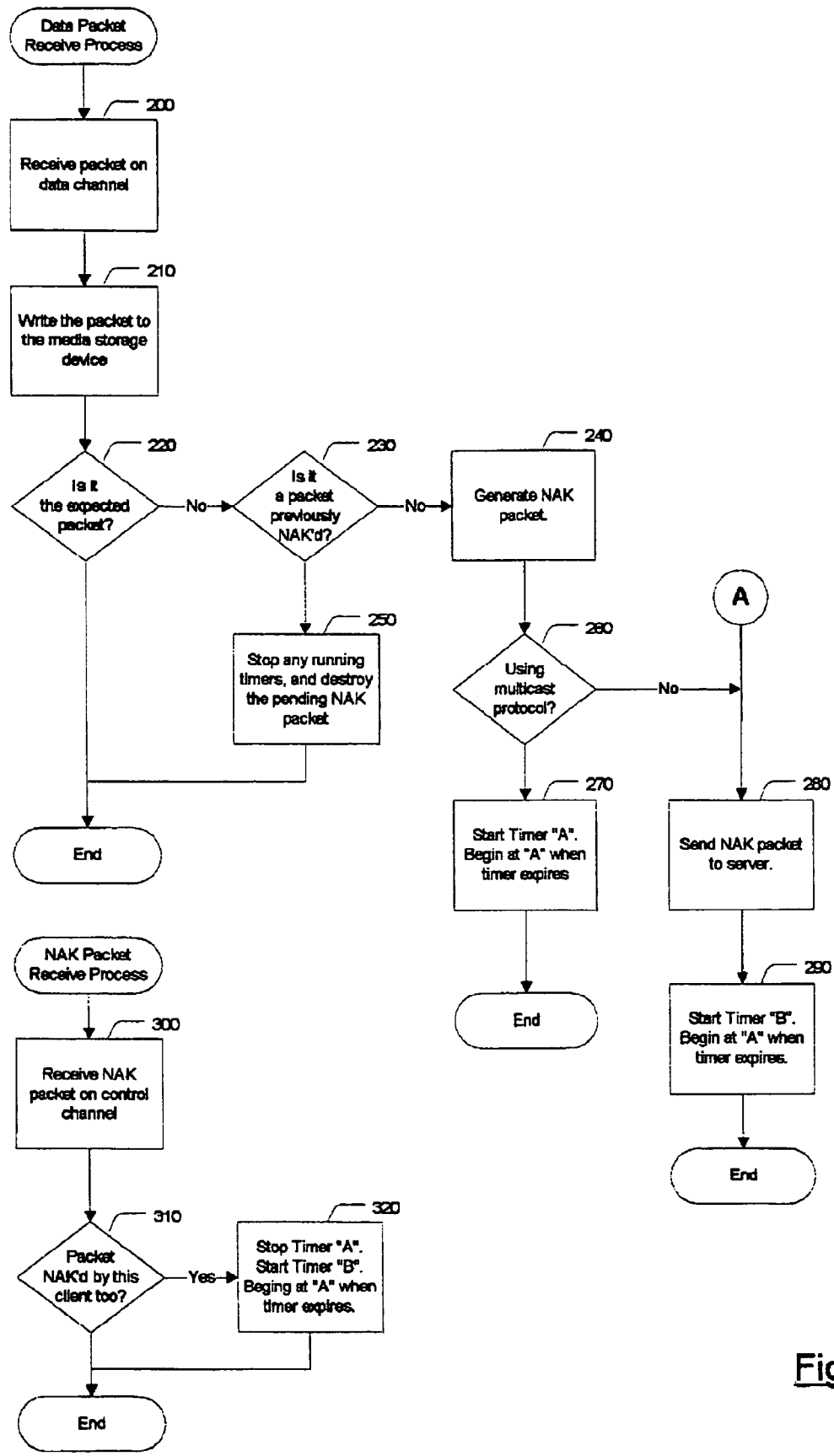
FIG. 4D is a flow chart diagram of the preferred file transmission of the present invention.

Referring to FIG. 4d, the receive loop is described. A packet is received 200 and written 210 to the local storage device on the client system 14. Each packet is serialized, and if the packet received was not the packet expected 220, some data may be missing. If the serial number of the packet is that of a packet previously missing, then the NAK table is updated to remove the entry corresponding to the previously missing packet, and any timers running on that data packet are stopped 250. If one or more packets are identified as missing 220 and 230, then a NAK packet is generated. In the case of a unicast connection 260, the NAK is sent immediately 280, otherwise the NAK suppression timer is started (Timer "A") 270 and processing of this incoming packet ends. If during the cycle of the NAK suppression timer, a NAK is received on the control channel 300 for the same packets missed by the client system 310, then the NAK suppression timer is stopped and the NAK data timer is started 320. When either of the timers expire, the previously generated NAK packet is transmitted to the server on the multicast control channel 280. The NAK data timer is restarted 290. The NAK cycle continues until there are no outstanding missing packets.

Figure 9B:
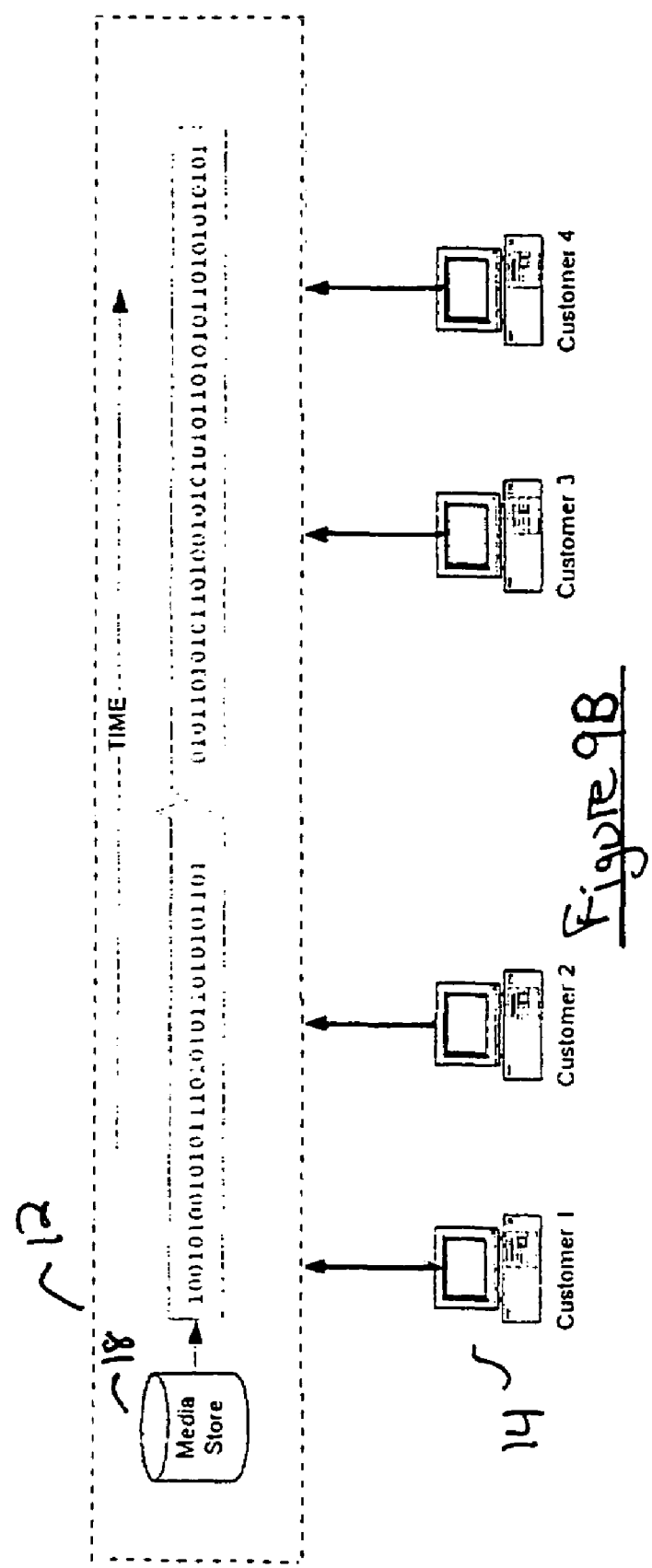
FIG. 9B is the preferred network data transmission of the present invention.

The difference between conventional network data transmission and that provided by the present invention is shown pictorially in FIGS. 9A and 9B, respectively. In FIG. 9A, multiple customers are seeking access to the same media file. To support simultaneous transmission in the conventional system, the media file must be duplicated at the time of transmission, one copy for each request instance (which significantly adds to the overall bandwidth requirements of the service). Alternatively, as shown in FIG. 9B, users are permitted simultaneous transmission of the data file at the temporal location in which a request is received, and the media file continually "loops around" to ensure each customer receives the entire media file. In the present invention the network bandwidth requirements are significantly reduced, since only a single instance of a media file is being transmitted over the network.

Figure 7:
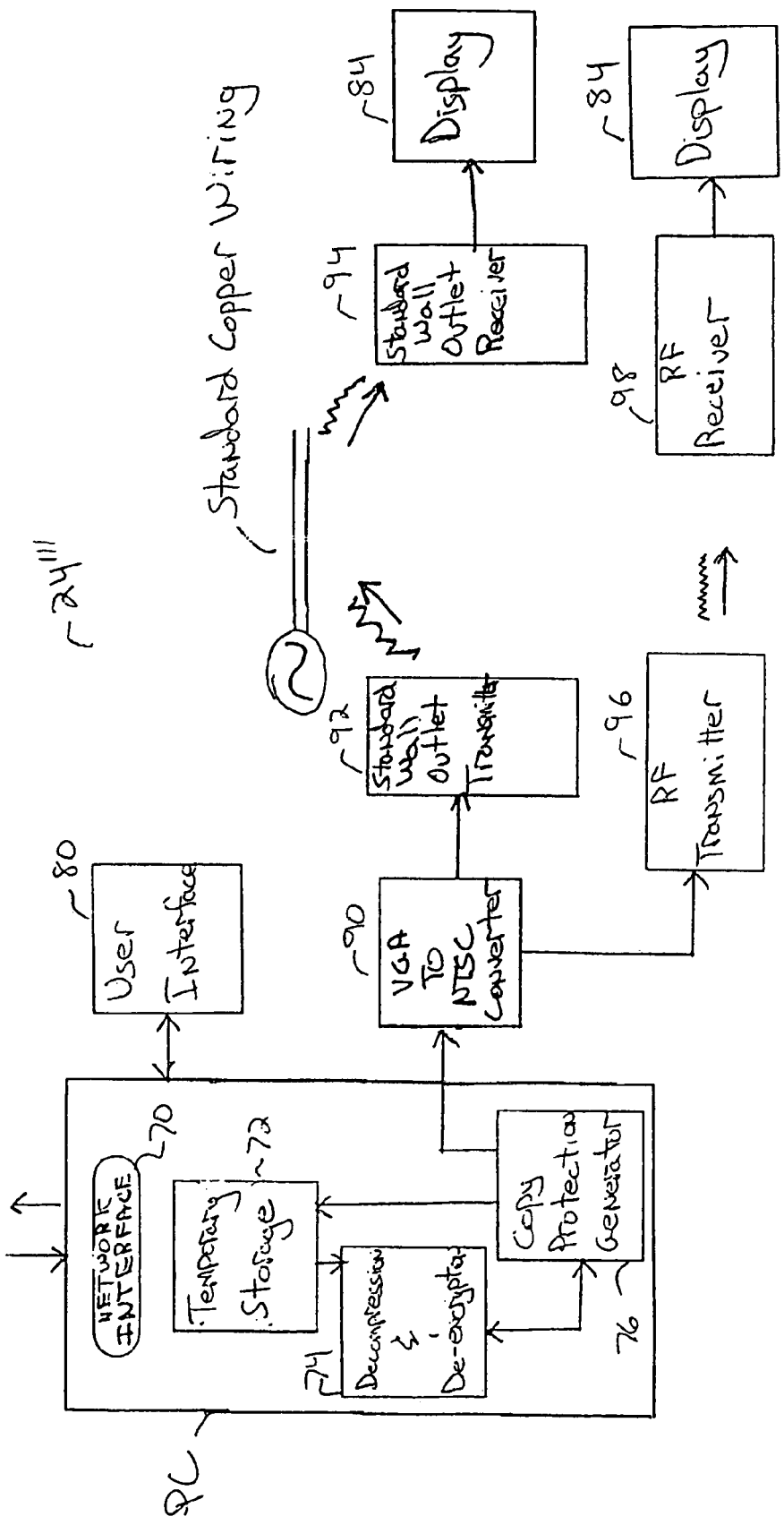
FIG. 7 is a block diagram of another embodiment of the media file playback system of the present invention.

Turning now to FIGS. 5-7, separate preferred embodiments of the media file playback system 24 are depicted. In the embodiment of FIG. 5, a self-contained system (for example, a "set-top" system) 24' is provided which includes a communications interface, a user interface and associated hardware to permit a user to communicate to the file distribution server 12, order a desired media file and receive and play the media file using system 24'. Each of the functional components of FIG. 5 are described below.

System 24' includes a network interface 70 (e.g., modem, etc.) permitting two-way communication between the user of system 24' and server 12, via network 16. A user interface 80 is provided to permit communication between the system 24' and a user. For example, user interface 80 can include a remote controlled interface that is displayed in a menu format (using display 84) whereby a user can chose among various options. In addition to, or alternatively, the remote controlled user interface 80 can include an input device (e.g. keyboard, etc.) to permit a user to enter commands to system 24'. The user interface is described more fully below in reference to FIG. 8. In essence, a user is permitted to enter one or more commands related to the transmission of one or more desired media files. These commands are temporarily stored on temporary storage 72. Temporary storage 72 can include a combination of RAM memory and permanent memory (e.g., hard disk) for storage of user-generated commands and for temporary storage of the selected media file. Upon entering commands, system 24' initiates communication with server 12, via network 16. It should also be noted that user interface 80 preferably also includes commands to permit a financial transaction to occur using financial transaction server 22, which permits a user to enter financial information (e.g., credit card information, etc.) to purchase the media file. Server 12 begins transmission of the media file, in accordance with the above-described embodiments. The media file is temporarily stored in temporary storage 72.

Upon the appropriate command from user, the media file temporarily residing in temporary storage 72 is accessed to be played. Upon such commands, the media file is sent to decompression and de-encryption 74 to decompress and/or de-encrypt the media file. Decompression and de-encryption includes appropriate hardware/software to achieve the stated functionality. Of course, decompression hardware and software are adapted to decompress a given media file in accordance with the pre-compressed media file, or to decompress the media file in accordance with compression and encryption 46 performed on the server side. To that end, the media file, as sent by the server system, may also include appropriate plug-in modules or CODECS, which may include one or more self-executing structured files, for a given compression/decompression scheme. In addition to media file selection performed by the user, the system 24' of the present invention also preferably includes means to generate a unique passwordable encryption information. This information can include a user-supplied password, or, alternatively, may include a serial number automatically generated by system 24'. The encryption information is forwarded to the server along with the media file request commands, and the server encrypts the file accordingly, using, for example, public-key or other encryption technology. Using the information generated by the system 24' and the server, the media file is de-encrypted.

As noted above, media file preferably includes time stamp data. This information is used both as a temporal marker for transmission purposes on the server side (discussed above), and as a time limiting marker associated with the media file. Once the media file is decompressed and/or de-encrypted, the file is sent to a copy protection generator 76. Preferably, copy protection generator 76 is a digital signal processing that encodes the media file with analog copy protection. Analog copy protection includes coding that is generated within the data file that inhibits the file from being transferred to another medium, for example, video cassette, by ensuring that any such copy is significantly degraded in quality. Copy protection hardware, such as provided by Macrovision®, include appropriate coding for a given media file type to be displayed in a preselected format (e.g., VGA, HDTV format, NTSC format, etc.). Preferably, copy protection 76 also includes the ability to add time limiting data that limits the viewable lifespan of the media file. Thus, for example, using the time stamp data generated by server, the copy protection generator can incorporate time limiting data, for example, 24 hours, into the media file, after which the media file is erased from the system 24'. Alternatively, copy protection generator 76 can include an automatic erase mechanism that erases the file as it is being viewed.

Once copy protection has been incorporated into the media file, the file is sent through a D/A converter 78 to convert the file into the appropriate output, e.g., HDTV, NTSC, VGA, etc., and is sent to a display 84, via display interface 82. Display 84 can include an analog display that is adapted to play the particular media file (e.g., HDTV, NTSC, PAL, etc.). Display interface 82 includes one or more interface jacks 82A . . . 82D for connection to a particular display 84. For example, jacks 82A . . . 82D can include an RCA jack, an input jack, a video out jack, etc. In addition, the media file may also include sound data (e.g., soundtrack data). Thus, interface 82 may further include sound output jacks (which may also include appropriate interfaces for Dolby™ Surround Sound connections, as are known in the art).

FIG. 6 depicts a PC embodiment of the media file playback system 24". In this embodiment, the media file is transmitted directly to a user's PC and the PC is appropriately adapted for direct viewing of the media file on the computer's monitor or separate display. To that end, system 24" includes a network interface 70, which includes appropriate hardware/software to permit the user to access the file distribution server 12 via the network 16. As in the previous embodiment, a user enters commands, via user interface 80, to transmit signals to the server to select a desired media file. The media file is transmitted and decompressed and/or de-encrypted 74 and stored on a removable media device 86. Removable media can include an Iomega Jazz disk, memory disk, hard disk, etc., and/or other portable storage devices known in the art. Referring to FIG. 6A, removable media includes temporary storage 72 to hold the media file, and is preferably adapted with on-board copy protection 76 (described above). A removable media player 88 is used in conjunction with the specific removable media type to display the media file on a display 84. In the preferred embodiment, the removable media device 86 is adapted to be able to interface with a standard VCR player. Thus, removable media device includes appropriate hardware to permit the video information to be fed to the analog head arrangement common to all VCRs. Alternatively, the removable media device can be played in an appropriately adapted media file playback system 24', described above.

In the system 24''' depicted in FIG. 7, a PC is used to obtain a media file from the server, and the media file is transmitted to a local display or a remote display using a remote transmission and reception system. The PC operates as described above with reference to FIG. 6. Upon output of the PC, the media file signals are sent to a converter 90. The converter 90 converts the media file from the chosen digital download format (e.g., VGA, etc.) to the appropriate display format, for example NTSC, HDTV, etc. In one form of this embodiment, the converted signal is sent to a standard wall outlet transmitter/receiver 92, 94. The transmitter/receiver 92, 94 can be supplied by VideoCom, Inc. The transmitter 92 is coupled to the internal wiring of the building (e.g., copper home and/or office wiring, etc.) which typically operates on 120 VAC at 60 Hz. The media file signals are modulated and sent to receiver 94, where the signals are demodulated and displayed on a display 84. Alternatively, the system 24''' can include and RF transmitter 96 and receiver 98 to transmit the media file signals to a remote display 84. RF transceivers, as are known in the art, include radio frequency modulation of the signals to broadcast the signal in a wireless manner. Of course, the modulation frequency can be chosen for a given environment and/or distance between transmitter 96 and receiver 98. Those skilled in the art will recognize that the PC depicted in FIGS. 6 and 7 includes all the necessary hardware/software to achieve the stated functionality, including that hardware/software to achieve communication and interaction with the server to order and transmit media files.

Figure 8:
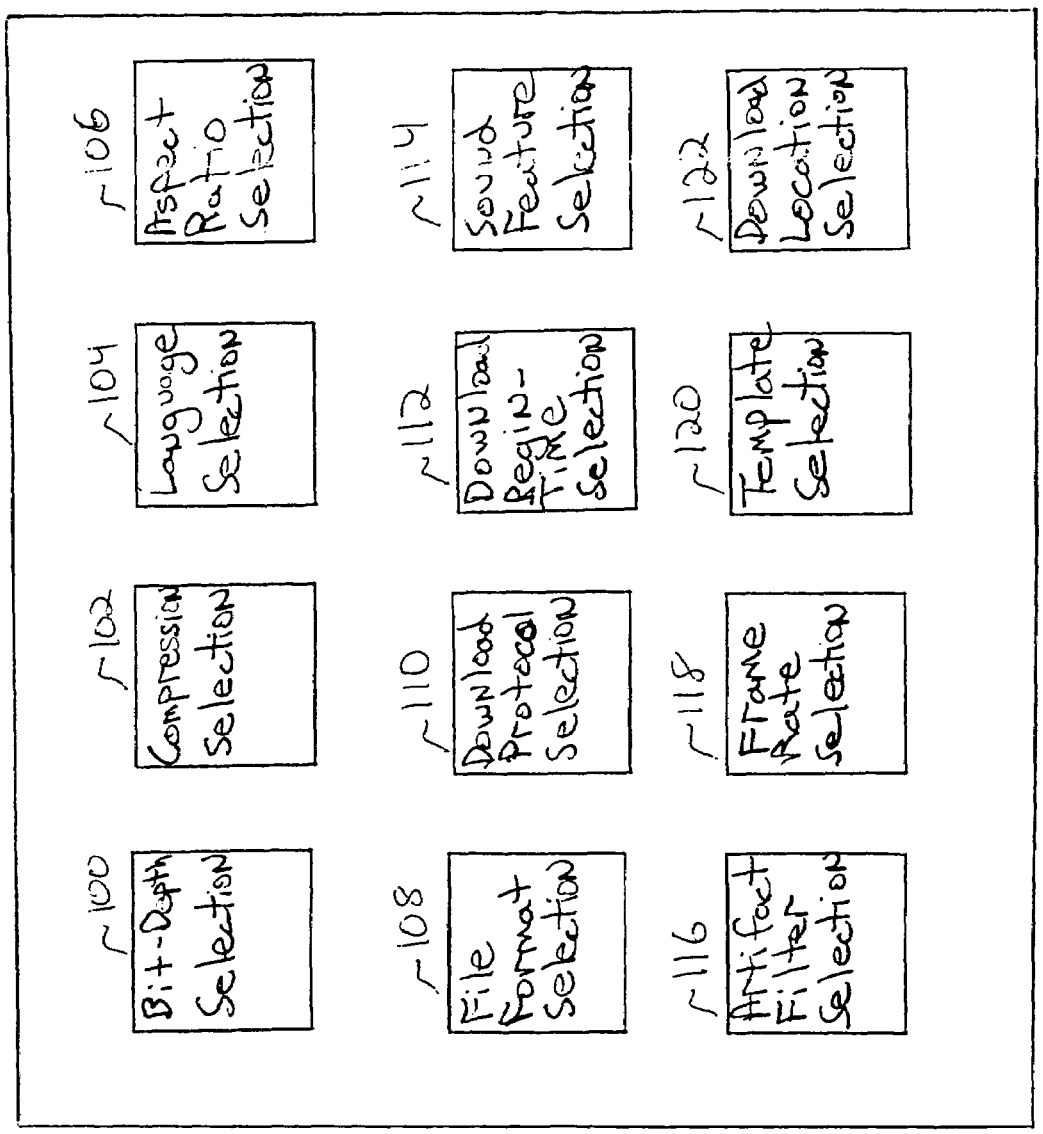
FIG. 8 is a block diagram of the user control interface system of the present invention.

Referring now to FIG. 8, the preferred user interface of the present invention is depicted in block diagram form. It should be noted that the functionality associated with the interface modules described below are preferably accomplished through appropriately programmed windowed environments and operating systems (e.g., Unix, Windows, Windows NT, Apple OS, etc.) as may be applied to the embodiments shown in FIGS. 6 and 7 above. Alternatively, a proprietary menu-driven environment may be used for the embodiment shown in FIG. 5. It should also be noted that the interface modules shown in FIG. 8 are only exemplary, and any of the stated functionality herein can be accomplished through an appropriately program module. As discussed herein, users are permitted to choose among various functionality when ordering a video file for transmission from the server. For example, certain video files will be stored on the server in a plurality of formats and pixel dimensions (e.g., VGA, letterbox, etc.), resolutions, frame rates, etc. Accordingly, a user may select a particular media file in a desired bit depth 100, language 104, aspect ratio (pixel dimension) 106, media file format 108, or sound feature (e.g., full stereo sound, mono sound, Dolby enhanced sound, etc.). The user may also choose a desired frame rate 118 or artifact filter selection (as may be associated with a certain compression technology) 1116. Additionally, the user may select a transmission protocol (e.g., HTTP, FTP, etc.) 110, select a transmission start time 112 and/or a preferred server transmission location 122. Also, as noted above, the user interface also preferably includes appropriate software to permit users to create templates 120 that are added to a media file.

Figure 10:
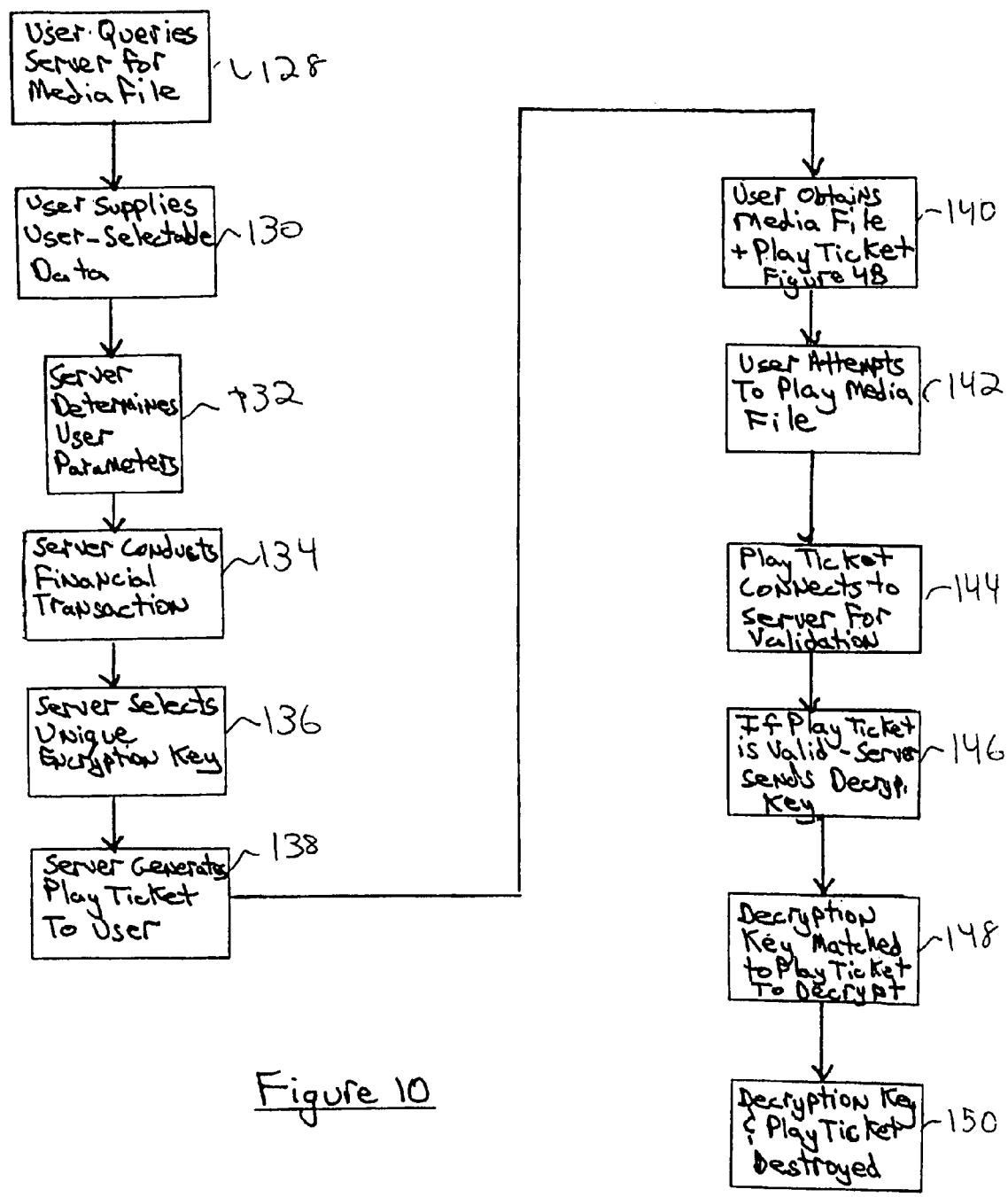
FIG. 10 is a flowchart of the preferred server-client data transmission including the preferred de-encryption process of the present invention.

FIG. 10 depicts a flow chart of the preferred server-client data transmission including the preferred de-encryption process of the present invention. It should be noted that the flow chart shown in FIG. 10 incorporates the description discussed above with reference to FIGS. 1-9. In the media file transmission system of the present invention, a user queries the server for a media file 128. If appropriate, the user supplies user-selectable data (i.e., that data associated with the user interface in FIG. 8) 130. The server determines the user's parameters 132, i.e., transmission protocol, etc. In addition, the server determines if the user has the appropriate plug-in programs and/or CODECS for a given media file. The user is prompted for payment information, and the server conducts a financial transaction 134. As described above, the preferred system stores files requiring encryption protection in encrypted form on the server systems storage devices 18. This encryption was performed using a unique, random key selected for each event requiring encryption protection. This encryption key is stored in a secure area of the server. The key for the given event is processed to cryptographically split the key into two parts. One part is placed into the play ticket provided to the user. The other part is placed into a validation database located in a secure area of the server. Both the play ticket and the media file are transmitted to the user 140 and stored locally on the user's system. The user attempts to play the media file 142. The play ticket interrupts the access to the media file, and automatically communicates with the server for validation 144. If the play ticket is valid, the server sends the second part of the decryption key 146, which when combined with the part from the play ticket results in the decryption key unique to the encryption of the media. Once the decryption key is recovered, both parts of the divided key are purged from the system. On the user's side, the decryption key is used to decrypt the media file 148. Thus, preferably, the decryption key remains resident in RAM and cannot be written to permanent storage. The user con then view the media file once only. If the user wishes to view the file more than once, process 142-150 discussed above repeats. As the play ticket has been used once, a new play ticket must be retrieved from the server. Preferably this new play ticket will not require the user to download the media file to replay, although some media files will be required to be purged from the system as they are playing.

Thus, it is evident that there has been provided a media file distribution system having adaptive transmission protocols that satisfies the aims and objectives set forth herein. Accordingly, the present invention is intended to be of broad scope, and only limited by the appended claims.

The invention claimed is:

1. A media distribution system, comprising:
a media file database configured to store media files, wherein one or more of the media files have been compressed prior to storage in the media file database;
a computing device configured to receive user requests for delivery of the one or more of the media files stored in the media file database, the computing device further configured to:
identify average network throughput between computing device and the requesting users; and
route the user requests for delivery of the requested one or more media files to a distribution server capable of servicing the user requests based upon at least the average network throughput; and
a distribution server coupled to the media file database, the distribution server configured to simultaneously deliver a single copy of the requested one or more of the media files identified in the routed user requests to the requesting users in less-than-real-time, wherein the distribution server automatically adjusts delivery of the requested one or more media files to the requesting users based on current average network throughput between the distribution server and the requesting users.

2. The system of claim 1, wherein one or more of the media files is divided into a plurality of frames, at least one of the plurality of frames including a header.

3. The system of claim 2, wherein one or more of the media files have been encrypted prior to storage in the media file database.

4. The system of claim 3, wherein at least one of the plurality of frames includes an encryption frame key in the header.

5. The system of claim 1, wherein one or more of the media files includes a digital watermark identifying a source of the one or more media files.

6. The system of claim 1, wherein one or more of the media files includes a digital watermark identifying ownership of the one or more media files.

7. The system of claim 1, wherein the computing device is further configured to identify a transmission protocol for delivery of the requested one or more media files to the requesting users.

8. The system of claim 7, wherein the computing device is further configured to route the user requests for delivery of the requested one or more media files to a distribution server capable of servicing the user requests further based upon at least the identified transmission protocol.

9. The system of claim 8, wherein the identified transmission protocol includes a multicast transmission protocol and the distribution server simultaneously delivers the one or more media files via a multicast transmission to the requesting users.

10. The system of claim 9, wherein the distribution server is further configured to repeat the transmission of the one or more media files via the multicast transmission to the requesting users until each of the requesting users has received the entirety of the one or more media files.

11. The system of claim 1, further comprising an advertisement database configured to store advertisement media files.

12. The system of claim 11, wherein an advertisement media file from the advertisement database is concatenated to the one or more media files based on at least an association parameter.

13. The system of claim 1, further comprising a financial transaction server configured to process a payment for delivery of the one or more media files requested by a user.

14. The system of claim 1, further comprising a second distribution server coupled to a second media file database, the second media file database configured to store media files, wherein one or more of the media files have been compressed prior to storage in the second media file database.

15. The system of claim 14, wherein the computing device is further configured to determine if the distribution server is no longer able to simultaneously deliver the requested one or more of the media files identified in the routed user requests to the requesting users in less-than-real-time after commencing delivery of the requested one or more media files.

16. The system of claim 15, wherein the computing device is further configured to reroute responsibility for the continued delivery of the requested one or more media files to the second distribution server.

17. The system of claim 14, wherein the computing device is further configured to determine if the distribution server is no longer able to optimally and simultaneously deliver the requested one or more of the media files identified in the routed user requests to the requesting users after commencing delivery of the requested one or more media files.

18. The system of claim 17, wherein the computing device is further configured to automatically and dynamically reroute responsibility for the continued delivery of the requested one or more media files between the first and second distribution server depending on at least the average network throughput.

* * * * *